June 11, 1929.                E. FREIVOGEL              1,716,882
                              TIRE REMOVER
                           Filed Oct. 30, 1928        2 Sheets-Sheet 1
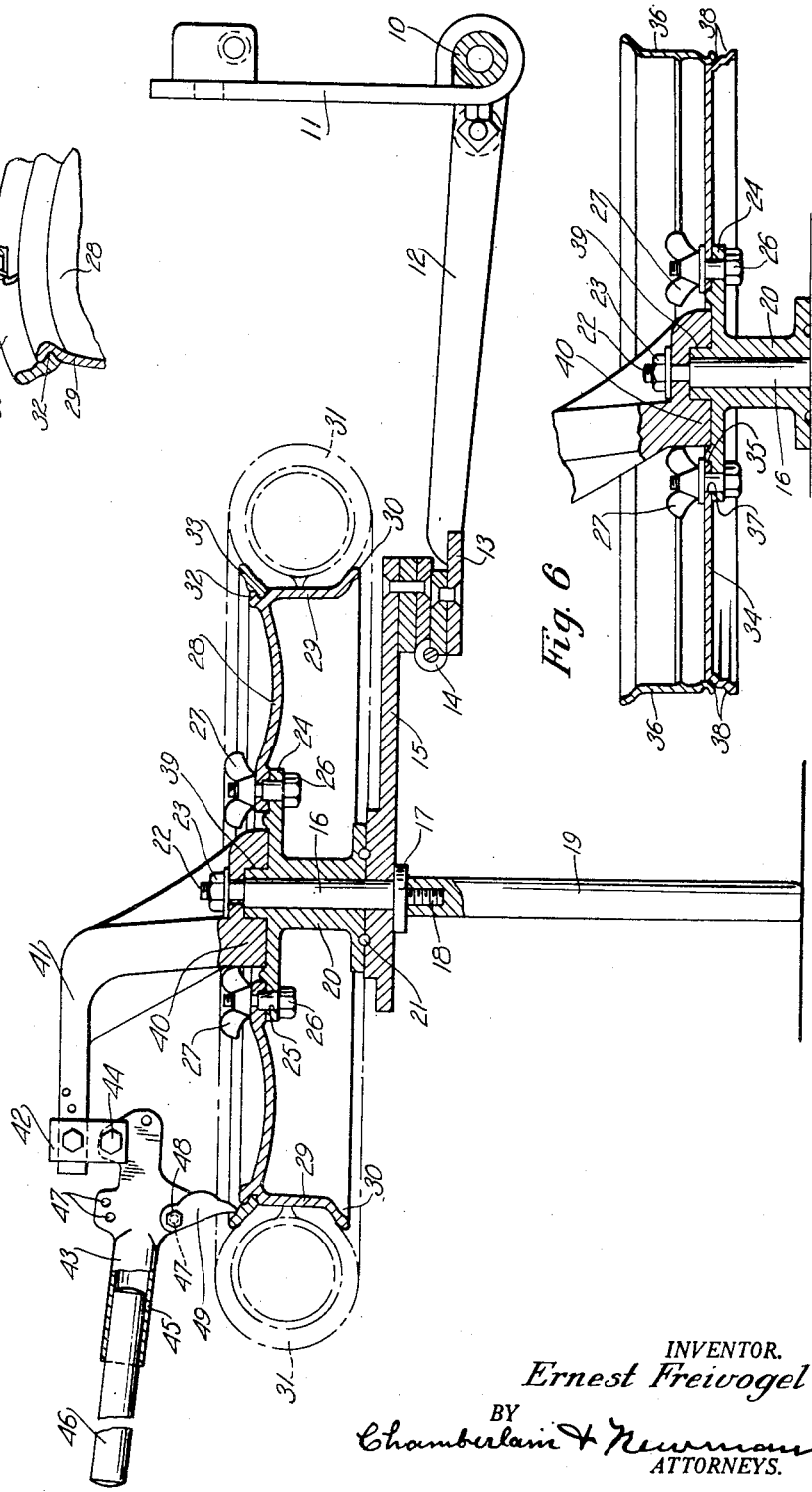
INVENTOR.
Ernest Freivogel
BY
Chamberlain + Newman
ATTORNEYS.

June 11, 1929.　　　E. FREIVOGEL　　　1,716,882
TIRE REMOVER
Filed Oct. 30, 1928　　　2 Sheets-Sheet 2
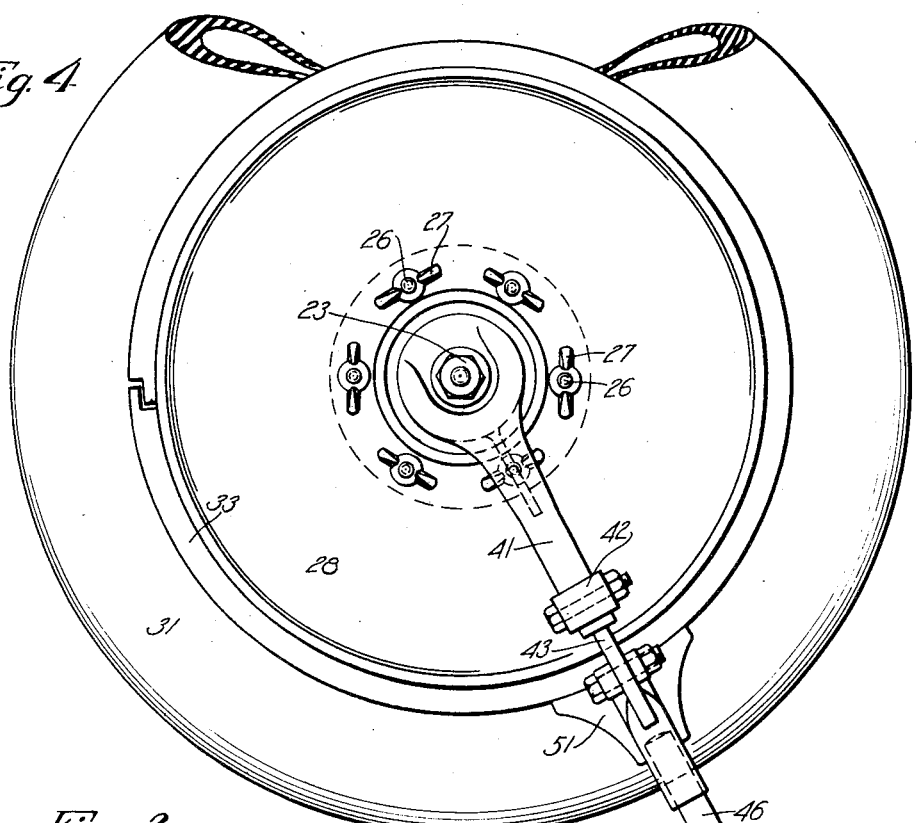
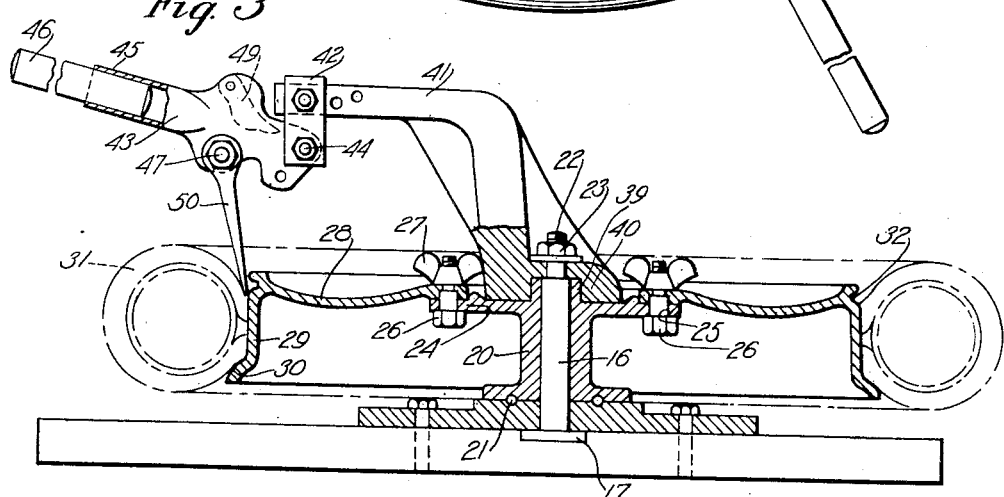
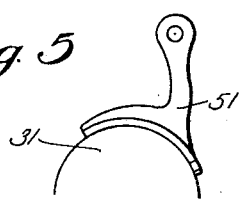
INVENTOR.
Ernest Freivogel
BY
Chamberlain & Newman
ATTORNEYS.

Patented June 11, 1929.

1,716,882

UNITED STATES PATENT OFFICE.

ERNEST FREIVOGEL, OF RIDGEFIELD, CONNECTICUT, ASSIGNOR OF ONE-HALF TO RICHARD A. JACKSON, OF RIDGEFIELD, CONNECTICUT.

TIRE REMOVER.

Refiled for abandoned application Serial No. 199,037, filed June 15, 1927. This application filed October 30, 1928. Serial No. 316,103.

This invention relates to new and useful improvements in automobile wheel, tire or rim support and tire remover, and is adapted to be used in connection with a combined tire-rack, and work-bench as disclosed in my prior application for Patent #159,557 or may be used upon an ordinary bench or stand as used in garages, work shops and the like. This is a refiling of my application for patent filed June 15, 1927, Serial No. 199,037.

An object of the invention is to provide an equipment which is particularly well adapted for the speedy removal of tires from the rims of automobile wheels (whether such rims may be of the solid demountable type or rims used on disc or wire wheels of the non-demountable type, and especially in instances where for any reason the tires may have become stuck to the rims and thus difficult to remove by the ordinary method, of manual manipulation of hand tools.

A further object of the invention is to provide, in combination with a rotary support for automobile wheels, or rims, a tool carrier or holder adapted for attaching thereto, holding in place, and supporting and operating several desirable forms of tools whereby the tire may first be cut loose and separated from the rim, and further, whereby the tire may be compressed and shoved off from the rim.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a central vertical sectional view through my improved wheel support, a wheel and tire, as in the operation of disconnecting a separable tire lock ring, from an automobile wheel, where positioned for holding the tire upon the wheel rim.

Fig. 2 shows a detailed perspective view of a portion of a wheel rim, ring and a part of my improved tool for disconnecting the lock ring from the wheel, or rim as is also illustrated in the preceding figure.

Fig. 3 shows a somewhat similar central vertical sectional view of an automobile wheel and tire with my improved tire removing means applied thereto, the same including a different form of tool from that shown in Fig. 1.

Fig. 4 shows a plan view of a wheel and tire mounted upon my stand, equipped and positioned for removing the tire from the wheel.

Fig. 5 shows a detailed side elevational view of the tire removing tool shown in Fig. 4 and adapted to be used in substitution of the chisel-like tool shown in Fig. 3; and Fig. 6 shows a central vertical sectional view of my improved wheel stand, with round table attached, for the support of a detachable tire rim.

As previously suggested, the invention is adapted to be used in connection with a portable tire rack such as may be carried upon an automobile, or fixed to a swinging, hinged or stationary table or bench, and it is therefore shown, in part, in Fig. 1 as applied to a portable stand adapted for attachment to the rear of an automobile, and wherein 10 represents a cross frame member of an automobile, such as is provided between the rearwardly projecting ends of the side frame members of certain makes of automobiles, and to which I elect to attach my stand. Projecting upwardly from the central portion of this cross frame member 10 is an upright support 11 to which a folding bench may be secured when not in use. Projecting forwardly of and hingedly attached to the cross member 10 are arms 12—12 which are joined at their outer ends to form a flat surfaced connecting plate portion 13 to which a hinge 14 is secured. One end portion of an extension base plate 15 is secured to one leaf of the hinge and is thus adapted to be folded in under the arm 12 when the stand is to be disconnected and closed up with the arms 12 folded against the member 11 and the base 15 folded under and against the arms 12—12. The base 15 is provided with a central post 16 having a flange 17 seated against the underside of the base 15, and includes a reduced threaded extension 18 projected downward, for the attachment of a column 19 whose lower end is intended to rest upon the ground to support the stand when the latter is brought into use for the changing of a tire.

Upon the post 16 is mounted a rotary support 20 which is of a hub-like form having a central vertical hole therethrough to receive the post 16, and an annular flange around its lower end portion that covers a part of the plate 15. A ball raceway is provided in the under side of this flange to receive bearing balls 21 also seated to roll in a similar annular groove formed in the top side of the plate 15, so as to insure a free rotary movement of the support upon the post 16 and plate 15. The upper end of this post 16 includes a reduced threaded extension 22 which is provided with a washer and nut 23 for securing the several parts in position as shown in the drawings. The upper portion of the hub support 20 is also provided with an annular flange 24 having an annular series of holes 25 therein adjacent to its outer annular edge portion to accommodate clamping bolts 26 that are provided with nuts 27 for securing the disk wheel to the hub support. These holes and clamping bolts are so positioned and provided in sufficient numbers to register with the holes in the web, of an automobile wheel, so that the same, when removed from an automobile wheel hub, which remains on the axle spindle, may be readily attached and quickly secured by the clamping of the nuts referred to.

The wheel shown in Figs. 1, 3 and 4 is a commercial type of disk wheel and includes the usual form of web portion 28 and a rim 29 having an annular flange 30 against which one side of the tire 31 is positioned. The front face of the rim portion of the wheel includes a usual form of annular groove 32 in which the customary separable lock ring 33 is positioned for holding the outer face of the tire on the rim.

In Fig. 6 I have provided a round table 34 having a relatively large central hole 35 therein, which table serves for the support of a tire rim designated on the drawings as 36. This table is provided with an annular series of holes 37 to receive the before mentioned bolts 26 and whereby the table is detachably connected to the hub support 20. The outer annular edge of this table is provided with several annular ledges 38, of different diameters, for the engagement and support of either edge of different size rims 36, and so that the same can be positioned thereon, with either side edge seated down upon one of the ledges as may be best suited for the operation of removing or applying a tire.

The hub-like support 20 is provided with an upwardly projected bearing 39 which together with the top face of the support 20 forms a bearing on which the base 40 of an arm 41 is rotatably mounted, said arm being movably held in said position upon the bearing 39 by means of the before mentioned nut and washer 23. This arm 41 projects out radially from the center of the post 16 upon which the hub 20 is supported, and serves to carry a hanger 42 that is adjustable inward and outward upon the arm and to and from the center of wheel so as to better adjust and position the operating lever 43 and its tools to different size wheels or rims as occasion may require. The operating lever has its end portion pivotally connected to the hanger as at 44 and includes a tubular body portion 45 in which a handle 46 is mounted. This lever is provided with holes 47 to receive a pivotal screw 48 that serves for the attachment of the several tools 49, 50 and 51 which are used in conjunction with a lever for operating upon the wheel ring 33 and the tire 31 for the removal of the same. The order in which these tools are usually used is the order in which the figures of the drawing showing the same are numbered, but they may be used in the order required. As for instance, the tool 49 shown in Figs. 1 and 2 is the first to be used, in the removal of a tire, in the manner illustrated in these two said figures and consists in adjusting the lever to the position shown in Fig. 1 with the point of the tool 49 in the slot 52, formed between the spliced ends of the ring 33 as is clearly shown in Fig. 2. With the parts positioned as thus described and downward pressure thus applied to the end of the handle 46 the point of the tool will be forced into the slot 52 in a way to spread the end portion of the ring, and to force the one end of the ring out from its said groove 32 of the wheel rim. After the end of the ring is thus dislodged, and the point of the tool placed back of the inner edge of the ring and between it and the outer annular peripheral surface of the wheel, the lever 43, arm 41 and parts carried thereby, can be drawn around beneath the ring in a way to entirely free it from the wheel or rim.

The chisel-pointed tool 50 can next be attached as shown in Fig. 3 and its point positioned between the wheel rim and tire and forced down lightly to loosen the tire. This tool, like the one previously described, can also be drawn or slid around with relation to the wheel and tire in a manner to free the latter from the wheel.

The third tool 51 shown in Figs. 4 and 5 is adapted to be pivotally connected to the operating lever by the before mentioned bolt and is provided with a broad oval faced portion which is shaped to conform to the side of a tire and is used to shove the sides of a tire in and off from the rim of a wheel.

In the operation of the tools upon the tire and wheel just described it is possible to either swing the lever and its tools around with relation to the wheel and tire or to hold the lever stationary and to rotate the wheel therebeneath which obviously would give the same effect, as the tools carried by the lever are held down in position upon the tire.

Having thus described my invention, what I claim and desire to secure by Letters Patent is:

1. A tire support and remover, comprising a base, a post mounted in the base, a wheel or rim support rotatably mounted thereon, means for the attachment of a wheel or rim thereon, an arm rotatably mounted on said support and post, means for movably securing the arm to the post and support, a lever pivotally connected to said arm and adjustable radially with respect to the center of a wheel when mounted on the support, means for detachably connecting a tool to said lever, and a tool connected to the lever for engagement with the wheel or rim and tire.

2. A tire support and remover, comprising a support having an extended bearing, means for the attachment of a wheel or rim to said bearing, a radially disposed arm mounted on the bearing and support, said support and arm being rotatably mounted with respect to each other, a hanger mounted on the arm and adjustable longitudinally thereon, an operating lever hingedly connected to the hanger, and a tool pivotally connected to said operating lever below said hinged connection for engagement with a tire when mounted on a wheel.

3. A tire support and remover, comprising a base including a pivotal post, a hub-like support rotatably mounted on said base and post and including a top flange portion having a series of openings therein, bolts carried in the openings for the engagement with a wheel flange, an arm mounted upon the support and post, a lever and tool carried upon the arm for engagement with a tire and rim, and means for causing a relative annular movement of the tool and tire to cause a separation of the latter from a wheel rim.

4. In a tire support and remover, the combination of a wheel support including an annular flange portion having a series of openings therein, bolts carried in the openings for the attachment of a wheel, said support also having a pivotal extension, an arm detachably mounted on said extension, said base and arm being rotatable with respect to each other, and means carried by the arm for operative engagement with the rim and tire of a wheel when carried upon said base.

Signed at Bridgeport in the county of Fairfield and State of Connecticut this 17th day of October, A. D. 1928.

ERNEST FREIVOGEL.